३,७३०,९३९
FLAME RETARDANT POLYAMIDE COMPOSITIONS CONTAINING CERTAIN SULFANILAMIDES

Paul Joseph Koch, Mount Freedom, and Julie Ann Lapham, Denville, N.J., assignors to Allied Chemical Corporation, New York, N.Y.
No Drawing. Filed Feb. 1, 1972, Ser. No. 222,694
Int. Cl. C08g 51/60
U.S. Cl. 260—37 N      10 Claims

ABSTRACT OF THE DISCLOSURE

Certain aromatic sulfonamide compounds impart flame retardance when blended with polyamides.

---

This invention relates to flame retardant polyamide compositions. More particularly, this invention relates to polyamides made flame retardant by the addition of certain aromatic sulfonamide compounds.

BACKGROUND OF THE INVENTION

Recent increasing public awareness and demand for safety of commercial products has led to new legislation requiring many types of plastic products, such as synthetic fibers, building materials, and molded articles, to be flame retardant. This in turn, has given new impetus to researchers to discover improved flame retardant additives and finishes which will meet these higher standards.

Numerous flame retardant additives for various polymers are known, generally halogen-containing compounds or organic phosphate compounds which have been found to impart some degree of flame retardance to polymers such as polyepoxides, polyesters, and polyurethanes. However, known fire retardant additives have been less than satisfactory when added to polyamides, commonly referred to as nylons, either due to lack of effectiveness or because they cause degradation of the physical properties of these polymers.

SUMMARY OF THE INVENTION

It is an object of the present invention to provide flame retardant polyamide compositions.

It is another object to provide flame retardant polyamide compositions having excellent physical properties.

Further objects will become apparent from the following detailed description thereof.

It has been discovered that certain aromatic sulfonamide compounds, when added in effective amounts, impart flame retardance to polyamides.

DETAILED DESCRIPTION OF THE INVENTION

The aromatic sulfonamide compounds effective as flame retardants for polyamides according to the invention have the formula

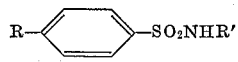

wherein R can be —NH$_2$ or —CH$_3$ and R' is hydrogen or a radical selected from the group consisting of phenyl, pyridyl,

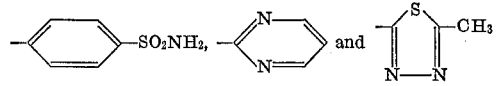

Illustrative of flame retardant compounds within the scope of the invention are:

Sulfanilamide

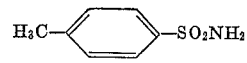

p-Toluenesulfonamide

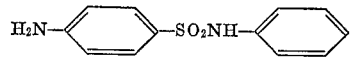

p-Sulfanilanilide

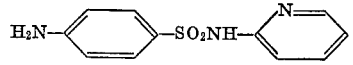

N'-2-pyridylsulfanilamide

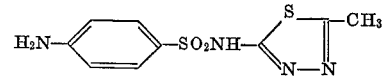

N'-(5-methyl-1,3,4-thiadiazol-2-yl)sulfanilamide

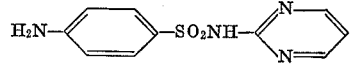

N'-2-pyrimidinylsulfanilamide

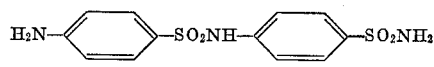

4'-sulfamoylsulfanilanilide

In the preferred compounds of the invention, R is —NH$_2$ or —CH$_3$ and R' is hydrogen.

The aromatic sulfonamide compounds described hereinabove are added to polyamides in amounts effective to impart flame retardance to the polymers. A large excess of the sulfonamide additive is to be avoided, however, to prevent excessive degradation of the polymer's physical properties. The manner of incorporating the sulfonamide additive into the polymer is not critical. The sulfonamide additive can be blended with polyamide particles or pellets prior to forming operations, or can be added directly to the molten polyamide during extrusion, spinning and the like.

The term polyamide as employed herein includes polycarbonamides having recurring —CONH— groups along the polymer chain. Several polyamides are in wide use commercially, such as condensation polymers, e.g. polyhexamethyleneadipamide, polyhexamethylenesebacamide, and the like; polymers of lactams having 4–12 carbon atoms in the lactam ring, e.g. polypyrrolidone, polycaprolactam, polycaprylolactam, polyoenantholactam, polylauryllactam and the like; and terpolymers of a lactam with ethylene/alkyl acrylate, alkyl methacrylate, or vinyl acetate copolymers and the like.

As is known to one skilled in the art such polyamides can also contain heat and light stabilizers, mold lubricants, terminating agents, nucleating agents, delusterants, pigments, fillers and the like in effective amounts.

The invention will be further illustrated by the following examples, but it is to be understood that the invention is not meant to be limited to the details described therein.

In the examples, parts and percentages are by weight. Limiting Oxygen Index Tests (hereinafter LOI) were carried out according to the procedure given in ASTM Test D-2863.

The compositions of the invention were also tested according to a Vertical Burn Test, whereby compression molded specimens 5" x ½" x ⅛" thick are clamped to hang vertically in air free from drafts. A blue bunsen flame ¾" high is applied to the lower end of the sample for 10 seconds and removed. If flaming or glowing combustion ceases within 25 seconds after removal of the test flame, the test flame is again placed under the specimen for 10 seconds immediately after flaming or glowing combustion of the specimen ceases. The test flame is again withdrawn and the duration of flaming or glowing combustion of the specimen is noted.

Materials which do not continue to burn, as noted by duration of flaming or glowing combustion, for 25 seconds after removal of the flame, are designated as self-extinguishing, or, SE.

Examples 1-2

Pellets of a spinning grade polycaprolactam having a formic acid viscosity of 60 and containing 0.3% of titanium dioxide, 0.019% phosphoric acid and 0.038% manganese chloride, were blended with various amounts of sulfanilamide, dried for 16 hours at 75° C. in a vacuum oven and extruded at 255° C. as a monofilament. The product was pelletized, dried and compression molded. Results are tabulated in the table below:

|  | Sulfanilamide, percent | LOI | Vertical Burn Test |
|---|---|---|---|
| Control | | 24.5 | Burns. |
| Example: | | | |
| 1 | 6.3 | 31.5 | SE. |
| 2 | 12.6 | 32.0 | SE. |

Example 3

The procedure of Example 1 was followed except substituting p-toluenesulfonamide (12.3%) for the sulfanilamide.

The product had an LOI of 28.0 and was rated SE by the Vertical Burn Test.

Example 4

The procedure of Example 1 is followed substituting N'-2-pyridylsulfanilamide (5.8%) for the sulfanilamide. Similar results are obtained.

Example 5

The procedure of Example 1 is followed substituting N'-(5-methyl-1,3,4-thiadiazol-2-yl)sulfanilamide (5.2%) for the sulfanilamide. Similar results are obtained.

Example 6

The procedure of Example 1 is followed substituting p-sulfanilanilide (9.5%) for the sulfanilamide. Similar results are obtained.

Example 7

The procedure of Example 1 is followed substituting N'-2-pyrimidinylsulfanilamide (4.8%) for the sulfanilamide. Similar results are obtained.

Example 8

The procedure of Example 1 is followed substituting 4'-sulfamoylsulfanilanilide (7.8%) for the sulfanilamide. Similar results are obtained.

Example 9

The procedure of Example 1 was followed substituting for the polycaprolactam a similar polycaprolactam containing 2% of chopped glass fibers.

The product had an LOI of 28.0 and was rated SE by the Vertical Burn Test.

Example 10

The procedure of Example 1 was followed substituting for the polycaprolactam a similar polycaprolactam containing 2% asbestos fibers.

The product had an LOI of 30.0 and was rated SE by the Vertical Burn Test.

Example 11

The procedure of Example 1 was followed substituting for the polycaprolactam a similar polycaprolactam containing 2% of a chopped aromatic polyamide derived from isophthalic acid and m-phenylenediamine.

The product had an LOI of 29.5 and was rated SE by the Vertical Burn Test.

Example 12

The procedure of Example 1 was followed substituting for the polycaprolactam a general purpose molding grade polyhexamethyleneadipamide. Results are summarized below:

| Sulfanilamide, percent | LOI | Vertical Burn Test |
|---|---|---|
| 6.3 | 24.5 | Burns. |
| | 32.0 | SE. |

We claim:
1. A flame retardant composition comprising a polyamide having recurring —CONH— groups along the polymer chain and an effective amount of a flame retardant compound of the formula

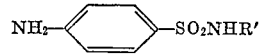

wherein R' is hydrogen or a radical selected from the group consisting of phenyl, pyridyl,

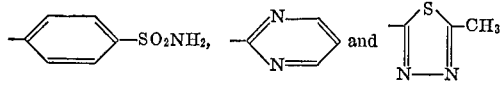

2. A composition according to claim 1 wherein R is hydrogen.
3. A composition according to claim 1 wherein the polyamide is polycaprolactam.
4. A composition according to claim 1 wherein the polyamide is polyhexamethyleneadipamide.
5. A composition according to claim 2 wherein the polyamide is polycaprolactam.
6. A composition according to claim 2 wherein the polyamide is polyhexamethyleneadipamide.
7. A composition according to claim 7 wherein the polyamide is polycaprolactam containing a filler.
8. A composition according to claim 7 wherein the filler comprises glass fibers.
9. A composition according to claim 7 wherein the filter comprises asbestos fibers.
10. A composition according to claim 7 wherein the filler comprises an aromatic polyamide.

References Cited

UNITED STATES PATENTS

| 3,549,651 | 12/1970 | Oswald | 260—30.8 R |
| 2,265,119 | 12/1941 | Coolidge | 260—30.8 R |
| 2,824,848 | 2/1958 | Wittcoff | 260—30.8 R |
| 3,491,042 | 1/1970 | Herman | 260—37 N |
| 3,052,646 | 9/1962 | Doggett | 260—30.8 N |
| 3,216,965 | 11/1965 | Cipriani | 260—30.8 N |

MORRIS LIEBMAN, Primary Examiner

P. R. MICHL, Assistant Examiner

U.S. Cl. X.R.

260—30.8 R, 45.8 N, 45.8 SN, 45.9 R